Patented Dec. 8, 1931

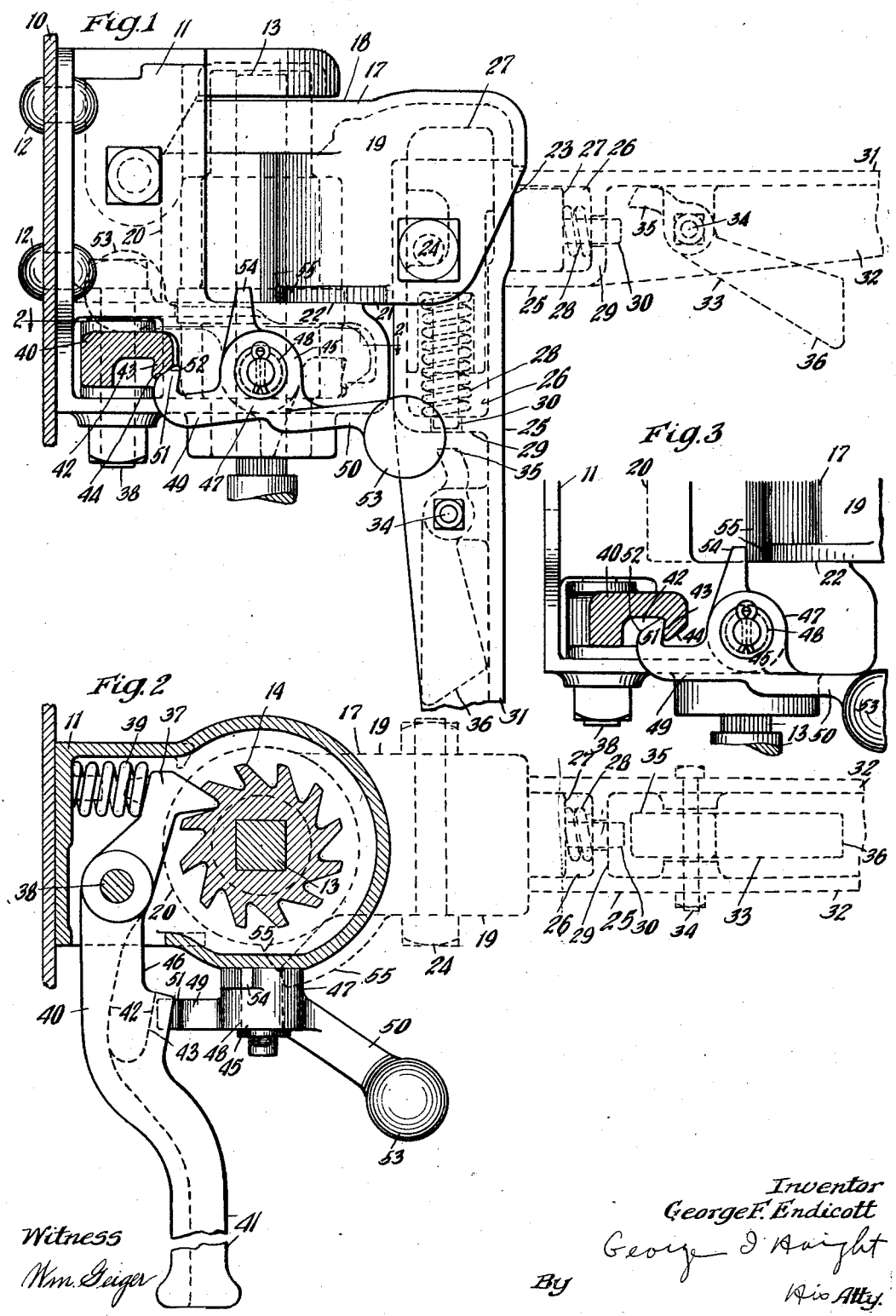

1,835,149

UNITED STATES PATENT OFFICE

GEORGE F. ENDICOTT, OF ST. PAUL, MINNESOTA, ASSIGNOR TO W. H. MINER, INC., OF CHICAGO, ILLINOIS, A CORPORATION OF DELAWARE

HAND BRAKE

Application filed March 31, 1927, Serial No. 179,778. Renewed June 28, 1929.

This invention relates to improvements in hand brakes.

In the operation of brakes of the vertical staff type, ratchet mechanism is provided for winding up the brake, and, in addition, a locking dog is provided which is urged to engaged position under the influence of a spring to prevent retrograde rotation of the brake staff while the chain is being wound thereon, and the dog provided with a release lever by which the dog may be manually pulled out of engagement to release the brake. Under operating conditions the dog is frequently permitted to resume engaged position before the brake is fully unwound, resulting in dragging of the brake shoes on the wheels.

An object of this invention is to provide means in the form of a latching element automatically operable under the influence of gravity for locking the release lever in position to hold the dog disengaged when the lever is moved in a releasing direction, in conjunction with elements associated with the operating mechanism of the brake, whereby certain movement of said operating mechanism serves to automatically disengage the latching element to permit the dog to resume its normal holding engagement, the latching element being of such character that the same may be swung to a over-balanced position so as to be maintained in inoperative condition under the influence of gravity.

A further object of the invention is to provide the operating mechanism of the brake with ratchet means which normally effect rotation of the ratchet wheel to wind up the brake chain on the brake staff, but which rides over the teeth of the ratchet wheel when moved in a reverse direction, in combination with detachable means which may be engaged with the ratchet means whereby the latter are utilized to rotate the brake staff in an unwinding direction to fully release the brake during the time the release dog is held in disengaged position.

Other and further objects of this invention will more clearly and fully appear from the description and claims hereinafter following.

In the drawings forming a part of this specification, Figure 1 is a vertical sectional view through the end wall of a car, showing a side elevational, part sectional view, of the brake mechanism, with my improvements incorporated therein, the latching mechanism being shown in non-holding position with reference to the release lever in full lines, and being shown in its over-balanced out-of-the-way position in dotted lines, while the operating lever is shown in full lines in inoperative position and in dotted lines in operative position. Figure 2 is a horizontal, sectional view of the invention, corresponding to line 2—2 of Figure 1, and showing a portion of the operating lever mechanism in dotted lines. And Figure 3 is a fragmentary part sectional, and part elevational view, similar to Figure 1, and showing the latching element in holding engagement with the release lever.

As shown in the drawings, the end wall of the car is indicated at 10, and to the end wall is secured a housing or bearing bracket designated generally by the reference character 11. The housing 11 is secured to the wall 10 by suitable rivets 12—12, and projecting into the housing is the usual vertical brake staff, a portion of which is indicated at 13, the staff having a square or other non-circular cross-section at the top thereof on which is rigidly fitted a ratchet wheel, indicated at 14, the ratchet wheel being provided with upper and lower sets of teeth in the usual manner. Oscillatably mounted within the housing 11 is a carrier or fulcrum member 17 having a top wall 18, opposite side walls indicated at 19, an inner end wall 20, and a bottom wall 21, the top wall 18 being provided with an opening which fits about the journal provided by the upper end of the ratchet wheel, while the bottom wall rests upon the portion 22 of the bracket 11, the outer end of the fulcrum member being open, as indicated at 23. The fulcrum member 17 is provided with a bolt 24 which extends through the side walls thereof, and swingably mounted upon the bolt 24 is an operating lever 25. The lever 25 is provided with a chamber 26 adjacent its inner end, in which is slidably mounted a pawl 27, said pawl being urged in a direction away from the end of the lever by means of a coiled spring 28, one end of which bears upon the pawl 27 and the opposite end of which bears upon the web 29 forming the bottom of the chamber in which the pawl is mounted. The pawl 27 is also provided with an extension 30 which projects toward the free end of the lever 25 through an opening in the web 29 when the pawl is in engagement with the ratchet wheel 14. The handle portion 31 of the lever 25 is formed with spaced walls indicated at 32, between which is pivotally mounted a gravity actuated latching member 33 upon a pin 34, which extends through the walls of the handle, the latching member being provided with a cam portion 35 adapted to engage the adjacent end of the extension 30 of the pawl 27 in certain positions of the parts, and said latching member has a weighted portion 36 which is adapted to urge the latching member in a clockwise direction when the operating lever is raised to horizontal position to cause engagement of the pawl 27 with the ratchet wheel 14. The pawl 27 is provided with a beveled face portion in the usual manner, so that when the operating lever 25 is elevated to horizontal position and oscillated, it will rotate the ratchet wheel in one direction, but will ride over the teeth of the ratchet wheel when the lever is moved in the opposite direction, during normal operation, but when it is desired to effect movement of the brake staff in an unwinding direction by means of the pawl 27, the weighted portion 36 of the latching member 33 is pressed upwardly to cause engagement of the cam portion 35 with the extension 30 upon the pawl, which prevents rotation of the pawl when the lever is moved in an unwinding direction.

To hold the staff 13 against reverse rotation, a locking dog 37 is provided, and said dog is pivotally mounted upon a bolt 38 disposed in the housing 11, said dog being adapted to engage the lower end of the ratchet wheel 14 and being normally urged toward engaged position with the ratchet wheel by means of a coiled spring 39. The dog 37 is provided with a release lever made up of a lever extension 40 having an offset handle portion 41. The extension 40 is provided with a recess 42 in its under surface, defining a rib or shoulder 43, which has its edge beveled to provide a cam face 44 adapted to cooperate with a locking or latching element 45. The extension 40 is cut out as indicated at 46 to provide clearance for portions of the latching element 45, hereinafter referred to.

The latching element 45 comprises an enlarged central portion 47, which is pivotally mounted upon a stud 48 fixed on the brake housing 11, an engaging portion 49 and a weighted portion 50. The engaging portion is provided with a hook or shoulder 51 and an outside cam face 52 which bears upon the cam face 44 of the shoulder 43 when the parts are in disengaged position. The weighted portion 50 extends at an angle to the engaging portion, as best shown in Figure 2, to provide clearance for movements of the lever 25, and at its end has a knob 53 for providing the required weight. The latching element is shown in full lines in Figure 1, and in Figure 3, in its non-holding and holding positions with reference to the release lever, and is capable of being moved to an out-of-the-way position, as indicated in dotted lines in Figure 1, so that it is over-balanced, and the knob 53 rests upon the top surface of the lever extension 40.

The central portion 47 of the latching element 45 is provided with an up-standing lug 54 adapted to cooperate with an offset rib or protuberance 55 formed upon the adjacent wall 19 of the fulcrum member 17, by which the latching element may be knocked out of holding engagement with the release lever to permit the dog to resume its engagement with the ratchet wheel. The cut-out portion 46 permits the lug 54 to clear the extension 40 when the latching element is swung to an over-balanced inoperative position. Oscillation of the fulcrum member is limited by reason of contact with the walls of the housing which operate as stops in the usual manner, and are so disposed in this instance that the latching element is never in the way of the lever 25.

In operation, when it is desired to wind the brake staff in a direction to set the brakes, assuming the parts to be in the position shown in full lines in Figure 1, the lever 25 is elevated to horizontal position, which causes the pawl 27 to engage the teeth of the ratchet wheel 14 under the influence of the spring 28, which causes projection of the extension 30 of the pawl 27 in a direction toward the cam portion of the latching member 33 in the lever handle; however, during the elevation of the operating lever, the cam portion 35 of the latching member 33 will be moved out of line with the extension 30, as best shown in dotted lines in Figure 1, so that oscillation of the lever 25 in a clockwise direction, effects corresponding rotation of the staff 13, while oscillation of the lever 25 in a reverse direction, causes the pawl 27 to ratchet over the teeth of the ratchet wheel, reverse rotation of the staff being prevented by reason of normal engagement of the dog 37 with the lower teeth of the ratchet wheel 14. When it is desired to release the brake, the lever 25 is dropped to its normal depending position, and the handle 41 on the release lever is pulled in a counter-clockwise direction, which causes the cam face 52 to ride on the cam face 44 until such time as the hook 51 engages behind the shoulder or rib 43 under the influence exerted by the weighted portion on the latching element. This prevents return of the dog 37 to engaged position with the ratchet wheel. During the time when the dog 37 is held out of engagement with the ratchet wheel, the brake staff is free to unwind to its full extent under the jarring of the car in service. At times the brake staff becomes jammed and fails to fully unwind even when free, and under such conditions the lever 25 may be raised to horizontal position and the end of the latching member 33 pulled inwardly, causing the cam portion 35 of said member to bear against the extension 30 on the pawl 27 to hold the later in engagement with the ratchet wheel so that during counter-clockwise movement of the lever the pawl 27 will be prevented from ratcheting over the teeth of the ratchet wheel, and will move the staff in an unwinding direction.

When it is again desired to wind up the brake chain, the operating lever 25 is elevated to horizontal position, and swung in a clockwise direction, in such manner as to bring the rib or protuberance 55 into engagement with the lug 54 on the latching element 45, causing counter-clockwise movement of the latch, which retracts the hook thereof from engagement with the shoulder 43 on the release lever, and permits the dog 37 to resume engagement with the ratchet wheel; in addition, the latching member may be disengaged under some conditions by manually grasping the knob 53 and pulling the latching element free of its holding engagement. Should it be desired to operate the brake without use of the automatic latching element 45, the latter may be turned in a counter-clockwise direction to an over-balanced condition, so that the weighted portion thereof rests upon the top surface of the release lever and maintains the latching element in inoperative position.

While I have herein shown and described the preferred manner of carrying out my invention, the same is merely illustrative, and I contemplate all changes and modifications that come within the scope of the claims appended hereto.

I claim:

1. In a hand brake, the combination with a member adapted to be rotated to effect tightening of the brake; operating means for effecting take-up rotation of said member; holding means for preventing retrograde rotation of said member; a pivoted latching element having a weighted portion and a latch means, said latch element being operable under the influence of gravity to engage a portion of said holding means to maintain the same in inoperative position when said holding means is moved in a releasing direction, said weighted portion of the latching element when said element is swung on its pivot to one extreme position, overbalancing the latching means to maintain the same in inoperative position under the influence of gravity; and a shoulder on said operating means engageable with said latch means when the operating means is actuated for automatically tripping said latching element to disengage the same from said holding means to free the latter.

2. In a hand brake, the combination with a brakestaff; of operating means for rotating said staff to effect tightening of the brake, including a member rotatable about the staff, said member having a handle pivoted thereto; a pivoted locking dog for said staff; means for yieldingly urging said dog to engaged position with the said staff to prevent retrograde rotation thereof, said dog having a handle extension, by means of which it may be manually released; a pivotally mounted latching element provided with a hook portion at one side of said pivot, adapted to automatically engage said handle extension when the latter is moved in a direction to release the dog, said latching element being provided with a weighted arm at the other side of said pivot for manually operating said element, said weighted arm normally urging the hook portion in a direction toward the dog; and means on said rotatable member engageable with the latching element when said rotatable member is swung to one extreme position by the operating handle, to trip said latching element and disengage the same from the dog to permit said dog to resume engaging position.

In witness that I claim the foregoing I have hereunto subscribed my name this 21st day of March, 1927.

GEORGE F. ENDICOTT.